United States Patent
Golding et al.

(10) Patent No.: US 9,798,743 B2
(45) Date of Patent: Oct. 24, 2017

(54) MAPPING DÉCOR ACCESSORIES TO A COLOR PALETTE

(71) Applicant: ART.COM, INC., Emeryville, CA (US)

(72) Inventors: Paul Golding, Cupertino, CA (US); John Yan, San Ramon, CA (US)

(73) Assignee: ART.COM, Emeryville, CA (US)

( * ) Notice: Subject to any disclaimer, the term of this patent is extended or adjusted under 35 U.S.C. 154(b) by 139 days.

(21) Appl. No.: 14/567,149

(22) Filed: Dec. 11, 2014

(65) Prior Publication Data

US 2016/0171304 A1 Jun. 16, 2016

(51) Int. Cl.
*G06F 17/30* (2006.01)
*G01J 3/52* (2006.01)
*G06T 7/90* (2017.01)

(52) U.S. Cl.
CPC .......... *G06F 17/3025* (2013.01); *G01J 3/526* (2013.01); *G01J 3/528* (2013.01); *G06F 17/30873* (2013.01); *G06T 7/90* (2017.01); *G06T 2207/10024* (2013.01)

(58) Field of Classification Search
CPC .. G06K 9/00; G06K 9/00671; G06K 9/00201; G06F 17/30; G06F 17/3025; G06T 7/40; G06T 7/60; G06T 7/408
USPC .................. 345/589, 632, 593, 597; 707/737
See application file for complete search history.

(56) References Cited

U.S. PATENT DOCUMENTS

| | | | | |
|---|---|---|---|---|
| 2006/0087517 | A1* | 4/2006 | Mojsilovic | G06T 7/90 345/593 |
| 2007/0143082 | A1* | 6/2007 | Degnan | G06T 11/60 703/1 |
| 2008/0018665 | A1* | 1/2008 | Behr | G09G 3/3233 345/629 |
| 2012/0231424 | A1* | 9/2012 | Calman | G09B 25/04 434/72 |
| 2014/0316665 | A1* | 10/2014 | Hargrave, Jr. | E02F 9/262 701/50 |

FOREIGN PATENT DOCUMENTS

WO    WO 2014070914 A1 *  5/2014    ......... G06Q 30/0641

* cited by examiner

*Primary Examiner* — Gregory J Tryder
*Assistant Examiner* — Michael Le
(74) *Attorney, Agent, or Firm* — Perkins Coie LLP

(57) ABSTRACT

The disclosure is related to a décor harmony service (DHS) that facilitates mapping of colors from a color palette to décor accessories in a setting, e.g., a room, such that the décor accessories, when arranged together, appear harmonious to a user. For example, using harmony-distribution rules, the DHS maps a set of décor accessories occupying "60%" of the area of a room to a main color of a color palette, a second set of décor accessories occupying "30%" to a feature color and a third set of décor accessories occupying "10%" to an accent color. The DHS generates a representation of the room, e.g., an image of the room, with the décor accessories having the assigned colors. The DHS facilitates a user to use the generated image for finding and purchasing décor products that match with a décor accessory in the generated image.

42 Claims, 13 Drawing Sheets

# MAPPING DÉCOR ACCESSORIES TO A COLOR PALETTE

BACKGROUND

Current tools for finding décor items such as art, rugs, decorating paint, furnishings, fashion, etc., are typically naïve. They do not address the problem of finding different décor items that match or harmonize to a particular required style. The current tools lack abilities to select décor items with visually common features, such as color or style. The current tools lack abilities to search across the Web for décor items based on décor attributes, such as color, the mood of a person, etc.

People like to decorate their rooms based on a particular color scheme, style, etc. This can typically involve having the décor items or accessories in the room with a specific set of colors that look visually appealing or harmonious to a particular person. A color scheme is often imagined as a "palette," which is a collection of colors that belong together in some sense. A harmonious palette contains colors that have known color-harmony relationships, for example on the Newtonian color wheel.

A user often thinks about color schemes, including palettes (i.e., specified sets of colors the user may wish to decorate the room with. However, there are some problems in realizing it. For example, the current tools lack the abilities for determining how to map the colors to the décor—i.e., which décor products (paint, trim, furnishings, art) should contain which colors. While some tools assign color to the décor products on a random basis, other tools may require a user to manually assign the colors to different décor products.

Another problem is that the current tools lack the capabilities to enable a user to visualize, or check, that a particular mapping of colors to décor products is appealing, e.g., aesthetically. Yet another problem is finding the products that will enable the user to realize in the real world a particular mapping that the user thinks is appealing. The current tools lack the abilities to enable the user to search for décor products, e.g., for purchase, that the user found appealing in a mapping.

DETAILED DESCRIPTION

Figure 1:
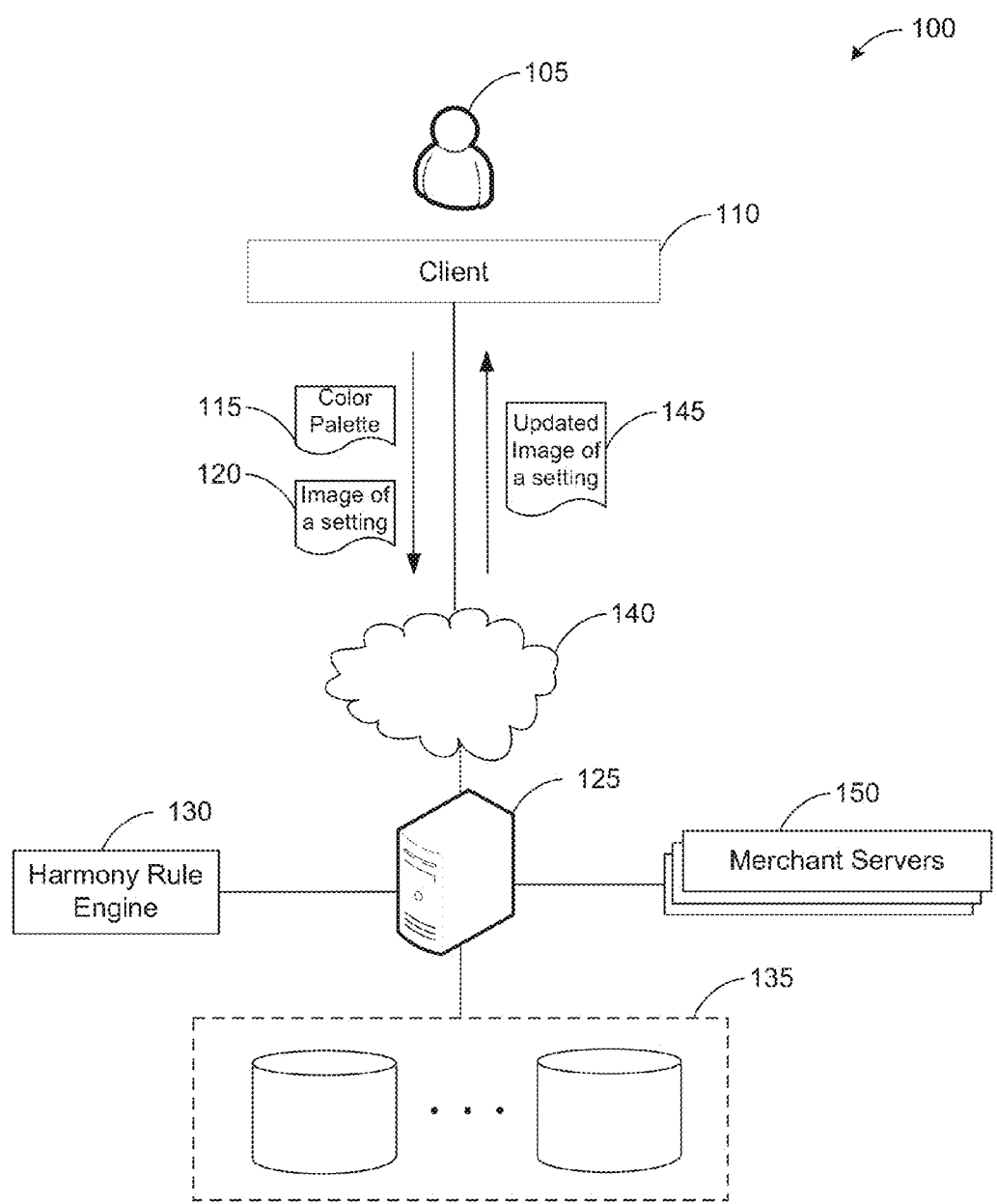
FIG. 1 is a block diagram illustrating an environment in which a décor harmony service application ("DHS application") can be implemented.

Disclosed are embodiments of a décor harmony service that facilitates harmonious mapping of colors from a color palette to a number of decor accessories, such that when the décor accessories are arranged or viewed together, e.g., in a room, appear harmonious to a user. In some embodiments, such harmonious mapping of colors is achieved using harmony-distribution rules. The harmony-distribution rules can specify which of the décor accessories has to be assigned to which color from the color palette. For example, using the harmony-distribution rules, the décor harmony service can map different décor accessories in a room to different colors of a color palette, e.g., user selected color palette, and generate an image of the room having the décor accessories with the assigned colors.

The décor harmony service classifies the colors from a color palette into a number of color groups. A color group can have one or more colors from the color palette. However, a color may not be classified into more than one color group. The décor harmony service analyzes a representation of a setting, e.g., an image of the setting such as an image of a room, and identifies the décor accessories (or a representation of the décor accessories, e.g., an image of the décor accessories) in the image of the setting as a number of image sections. The décor harmony service assigns or maps each of the image sections, e.g., a décor accessory or a portion of the décor accessory, to one of the color groups based on the harmony-distribution rules. In some embodiments, the décor harmony service assigns or maps the image sections to the colors by classifying the image sections into image regions and assigning the image regions to distinct color groups. After the mapping of the image sections to the colors is completed, the décor harmony service can generate a representation of the mapping, e.g., an updated image of the setting, where the décor accessories have colors based on the mapping.

Further, in some embodiments, the décor harmony service facilitates the user to use the updated image of the setting to search for décor accessories having a specified color, e.g., a color that is assigned to the décor accessory in the updated image of the setting based on the mapping, e.g., for purchase. The décor harmony service can perform the search in a storage system, e.g., a database, associated with the décor harmony service or other servers, e.g., servers of a third-party, such as a merchant affiliated with the décor harmony service.

A décor accessory can include a number of décor items, e.g., an artwork, a painting, a picture, an artifact, an architectural piece, an arrangement of artworks, a color selection, a décor of a room, a rug, a mat, furnishings, clothes, jewelry, fashion, car interiors, flower arrangements, gardens. In some embodiments, a décor accessory is any real world object that has a color as one of its attributes. An image of a setting can include an image of an arrangement of the décor accessories, e.g., an image of a room having the décor accessories, an image of a car having the décor accessories, an image of clothes.

While the setting and or a décor accessory in the setting can be represented using an image, the setting and/or the décor accessory can be represented in other formats, e.g., using textual descriptors. A textual descriptor can be an attribute that describes the setting and/or the décor accessories in the setting. The attributes can include a name of a décor accessory, an identification (ID) of the decor accessory, dimensions of the décor accessory, a type of the décor accessory, a categorization of the décor accessory, a manufacturer of the décor accessory, a feature in the décor accessory, dimensions of the setting, etc.

Further, while the décor harmony service generates the representation of the mapping as an updated image of the setting, the décor harmony service can also generate the representation of the mapping in other formats, e.g., text format. The textual representation can describe which of the décor accessories (or a portion thereof) are mapped to which colors, e.g., a mapping of an attribute of the décor accessory to a name of a color. For example, the textual representation of the mapping can indicate that a couch with ID "C1" is a mapped to a color "ocean blue" from color group "main colors." It should be noted that the color palette can also be represented in various formats, e.g., as an image having colors of the color palette, and a text file having textual descriptors of the colors of the color palette.

Environment

Turning now to the Figures, FIG. 1 is a block diagram illustrating an environment 100 in which the décor harmony service application ("DHS application") can be implemented. The environment 100 includes a server computing device 125 ("server") that implements the décor harmony service. The server 125 can be implemented as a single machine or as a distributed computing system, where different functionalities of the server 125 (which are described in the following paragraphs) are distributed over several computing systems in the environment 100. Further, in some embodiments, the DHS app can have a client portion and a server portion, where the client portion can be installed at a client computing device ("client"), such as a client 110, and the server portion can be installed at the server 125.

A user, such as the user 105, can use the client 110 to access the DHS application. The client 110 can be a device of a number of types, e.g., a desktop, a laptop, a smartphone, a tablet personal computer, a wearable device. In some embodiments, the client portion of the DHS application can be installed as an application "app" on the client 110. The client 110 can access the server 125 via a communication network 140, e.g., Internet, intranet, local area network, wide area network.

The server 125 can analyze a color palette 115 and classify the colors in the color palette 115 into a number of groups, e.g., a first color group, a second color group, a third color group and so on. The server 125 can analyze an image of a setting 120, e.g., an image of a room, to identify the décor accessories in the image of the setting 120 and map each of the décor accessories to one of the color groups. In some embodiments, the server 125 generates the mapping of the décor accessory to a color using a harmony rule engine 130, which uses a set of harmony-distribution rules that determines the mapping of a particular décor accessory (or a portion of the décor accessory) in the image of the setting 120 to a color from a particular color group.

The harmony distribution rules specify the assignment of a particular décor accessory (or a portion thereof) to a color group based on various criteria. In some embodiments, the harmony-distribution rules define the assignment based on an area of the image of the setting. For example, the harmony-distribution rules can specify that a first specified percentage of the area of the room, e.g., "60%" of the room, has to be assigned to a first color group, a second specified percentage, e.g., "25%," to a second color group, and a third specified percentage, e.g., "15%", to a third color group. The server 125 can identify the décor accessories in the image of the setting 120 that form the specified percentages and assign them to the corresponding color group. After the décor accessories are assigned to a particular color group, the server 125 can generate an updated image of the setting 145 in which the décor accessories are generated with colors based on the mapping. In some embodiments, the server 125 generates the updated image of the setting 145 using computer generated imagery (CGI) techniques.

Referring back to the color palette 115, the color palette 115, in some embodiments, is a harmonious color palette. Typically, a harmonious color palette contains colors that have known color-harmony relationships, for example, on the Newtonian color wheel. The relationships can include analogous relationships (e.g., shades of adjacent colors), complementary relationship (e.g., shades of colors on opposite sides of the color wheel) etc.

Figure 2A:
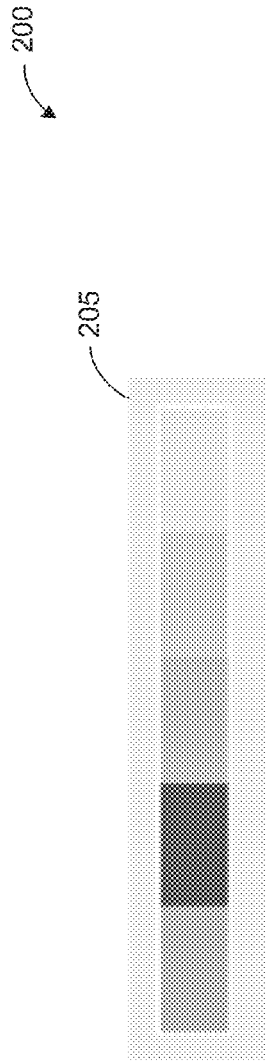
FIG. 2A illustrates an example of a color palette, consistent with various embodiments.

FIG. 2A illustrates an example 200 of a color palette, consistent with various embodiments. The example 200 includes a color palette 205 that includes a set of five colors. In some embodiments, the color palette 115 of FIG. 1 is similar to the color palette 205. While FIG. 2A illustrates the color palette 205 as having five colors, the number of colors in a color palette is not restricted to five, and can vary.

Referring back to FIG. 1, the server 125 classifies the set of colors in the color palette 115 into various color groups using various techniques. For example, the server 125 can analyze the color palette 115, determine the colors in the color palette, e.g., based on RGB value of the colors or other image analysis techniques, and determine a color group to which a particular color belongs by comparing the particular color with the colors of various color groups stored at a storage system, such as the storage system 135 associated with the server 125. In some embodiments, the storage system 135 is implemented as a database residing on one or more storage devices, e.g., hard disk drives, solid state memory, magnetic tapes, etc. The storage system 135 stores information that may be necessary for the operation of the DHS application, e.g., color palettes, images of the settings, images of the décor accessories, user profile information. The server 125 can include information regarding a number of possible color groups and the colors that belong to each color group. A user, such as an administrator of the server 125, a curator, an interior decorator or a person who has knowledge regarding colors can specify the information regarding the classification of various colors into various color groups. In another example, the color palette 115 can itself include information regarding a color group to which the particular color belongs, e.g., as metadata of the color palette 115.

Figure 2B:
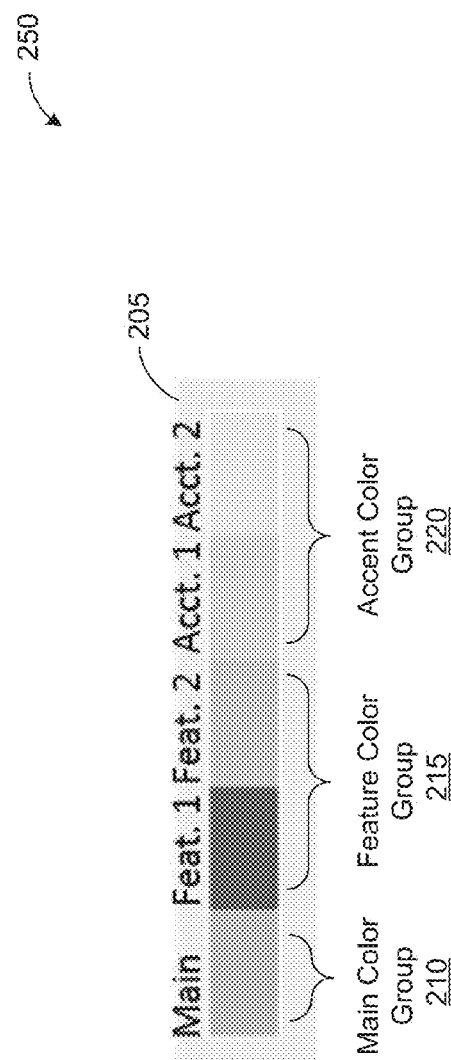
FIG. 2B illustrates an example classification of the colors of a color palette of FIG. 2A into various color groups, consistent with various embodiments.

FIG. 2B illustrates an example classification 250 of the colors of the color palette 205 into various color groups, consistent with various embodiments. In the example classification 250, the server 125 classifies the colors of the color palette 205 into three color groups—a main color group 210, a feature color group 215 and an accent color group 220. Each of the color groups can have one or more colors from the color palette 205. For example, the main color group 210 has one color and each of the feature color group 215 and the accent color group 220 has two colors. While FIG. 2B illustrates the color palette 205 being classified into three color groups, the number of color groups a color palette is classified into is not restricted to three, and can vary. Further, in some embodiments, the server 125 may not classify a color of the color palette 205 into more than one color group.

Referring back to FIG. 1, the color palette 115 can be input by the user 105 in many ways. For example, the server 125 can present the user 105 with a number of color palettes at the client 110 and the user 105 can select one of the color palettes as the color palette 115. In another example, the user 105 can input an image of a color palette as the color palette 115. In yet another example, the user 105 can take a picture of a color palette, e.g., using a camera associated with the client 110, and input the picture of the color palette as the color palette 115. In still another example, the user 105 can input an image of a décor accessory, such as an image of an art work, and instruct the server 125 to find color palettes that are related to the décor accessory. The server 125 can analyze the image of the décor accessory using various image analysis techniques, e.g., blob detection (which is described in further detail at least with reference to FIG. 6), identify the characteristic colors in the image of the décor accessory and present one or more color palettes having colors that are related to the characteristic colors to the user 105. The user 105 can select one of those color palettes as the color palette 115. In yet another example, the user 105 can input a color palette using textual descriptors, such as a name of a color, an identification (ID) associated with the color.

Similarly the image of the setting 120 can be input by the user 105 in many ways. For example, the server 125 can present the user 105 with images of a number of settings and the user 105 can select an image of one of the settings as the image of the setting 120. In another example, the user 105 can input the image of the setting 120. In yet another example, the user 105 can take a picture of a setting, e.g., using a camera associated with the client 110, and input the picture of the setting as the image of the setting 120. The server 125 analyzes the image of setting 120 using various image analysis techniques and identifies the décor accessories in the image of the setting 120. In yet another example, the user 105 can input a representation of the setting using textual descriptors, e.g., attributes that describe the setting and/or the decor accessories in the setting. The attributes can include a name of a décor accessory, an ID of the decor accessory, dimensions of the décor accessory, a type of the décor accessory, a categorization of the décor accessory, a manufacturer of the décor accessory, dimensions of the setting, etc.

Figure 3:
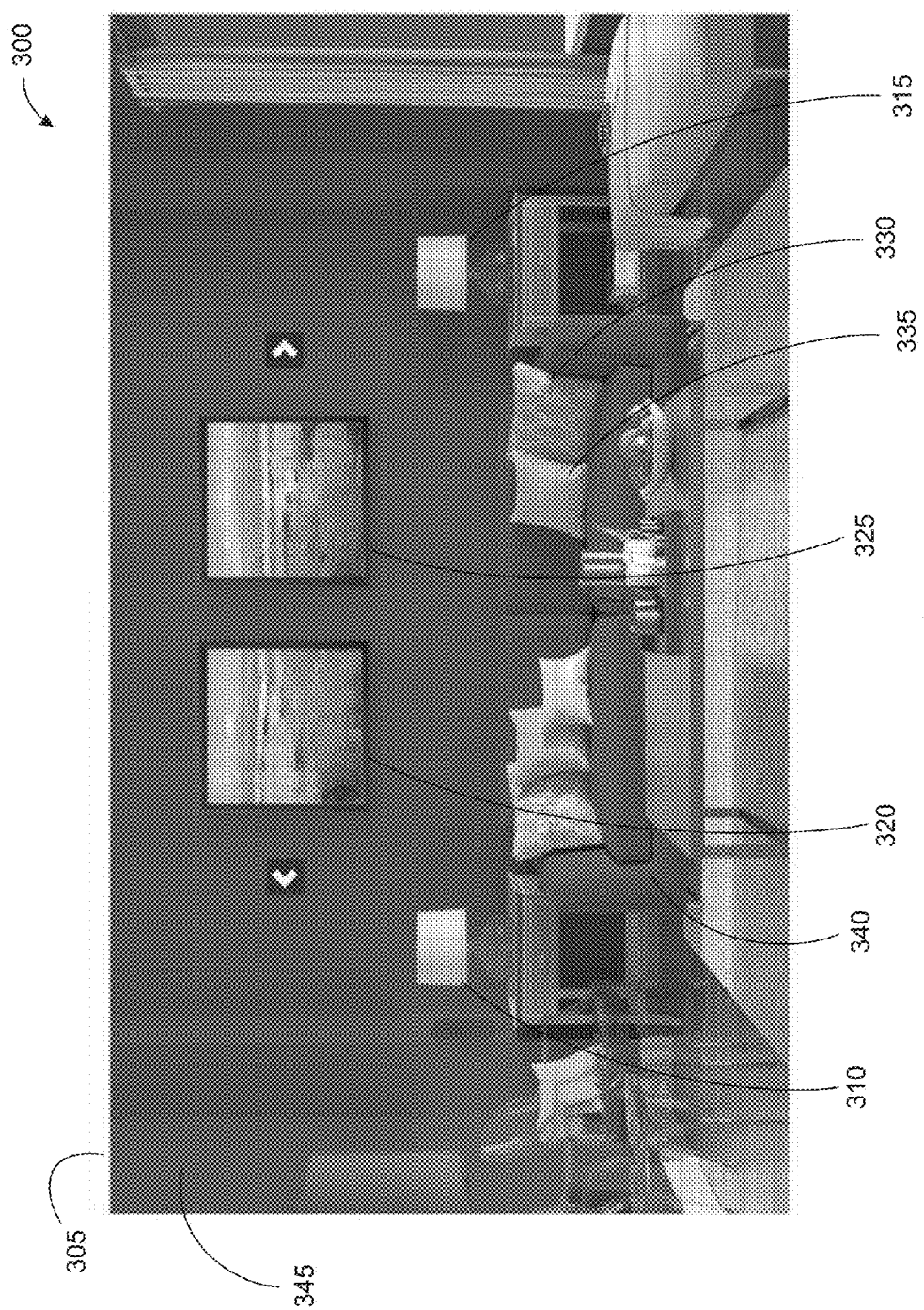
FIG. 3 illustrates an example of an image of a setting, consistent with various embodiments.

FIG. 3 illustrates an example 300 of an image of a setting, consistent with various embodiments. The image of a setting 305 in the example 300 includes a number of décor accessories, e.g., table lamps 310 and 315; art works 320 and 325, a first cushion 330 and a second cushion 335, a sofa 340 and a wall 345. The server 125 can identify each of these décor accessories as an image section. In some embodiments, the image of the setting 120 of FIG. 1 is similar to the image of the setting 305.

Referring back to FIG. 1, in some embodiments, mapping the décor accessories to the color groups can include the server 125 analyzing the image of the setting 120, e.g., using various image analysis techniques, to identify each of the décor accessories in the image of the setting 120 as an image section. Next, the server 125 can group the image sections into a number of image regions based on the harmony distribution rules. For example, if the harmony distribution rules indicate the number of color groups is to be a specified number, then the server 125 classifies the image sections also into the specified number of image regions. That is, the server 125 can classify the image sections into as many image regions as the number of color groups. The server 125 can assign each of the image regions to a distinct one of the color groups based on the harmony distribution rules.

All the image sections, i.e., décor accessories, in a particular image region are assigned a color from the assigned color group. If the assigned color group has more than one color, the server 125 can assign the image sections in the image region to one or more of the colors in the color group in many ways, e.g., randomly, a specified number of image sections to a particular color, a specified number of image sections to each of the colors in the color group. After the assignment is completed, the server 125 can generate the updated image of the setting 145, in which the image sections are of the color assigned to them based on the mapping. In some embodiments, the server 125 can generate many mappings and therefore, many updated images of the setting. Different mappings have different assignments of the image sections to the colors. For example, in a first mapping, a first image region can be assigned to a first color group and in a second mapping the first image region can be assigned to a second color group. In another example, in a first mapping, an image section in a particular image region can be assigned to a first color from the color group assigned to the image region and in a second mapping, the image section can be assigned a second color from the image region.

The user 105 can use the updated images of the settings for various purposes. For example, if the user 105 likes a particular updated image of the setting, e.g., updated image of the setting 145, the user 105 can use the updated image of the setting 145 to ask an interior decorator to furnish the room of the user 105 as indicated in the updated image of the setting 145. In another example, the user 105 can use the updated image of the setting 145 to request the server 125 to search for a particular décor product that matches with, e.g., same as or similar to, a particular décor accessory in the updated image of the setting 145 for purchase by the user 105. The server 125 can use one or more of the attributes of the particular décor accessory, e.g., color as generated in the updated image of the setting 145, as a search parameter for searching the products. The server 125 can perform the search for the products in the storage system 135 and/or other locations such as a server 150 associated with a merchant affiliated with the DHS application. In some embodiments, the products are indexed based on one or more of their attributes in the storage system 135. The server 125 can then present the products to the user 105 at the client 110. The user 105 can then purchase one or more of the products.

In some embodiments, the server 125 stores the attributes of the décor accessories of the image of the setting 120 as metadata of the image of the setting 120. An attribute can include an identification (ID) of the décor accessory, a color, a size, a manufactures, a retailer, a type, an area occupied by the décor accessory in a particular image of the setting, positioning of the décor accessory in the image of the setting, etc. The server 125 obtains information regarding the attributes in various ways. For example, a user such as an administrator who inputs the images of settings can input the information regarding the attributes of the décor accessories. In another example, if the image of the setting 120 is input by the user 105, the server 125 can analyze the image of the setting 120 to determine at least some of the attributes and/or request the user 105 to input information regarding at least some of the attributes. In yet another example, if the images of the settings are generated using CGI, the server 125 can determine or derive the various attributes of the décor accessories by analyzing the image of the setting based on CGI techniques.

In some embodiments, the server 125 assigns a portion of the décor accessory to one color and another portion of the décor accessory to another color. For example, in FIG. 3A, a portion of the first cushion 330, e.g., the zig-zag lines on the first cushion 330, is assigned one color and the rest of the first cushion 330 with another color. In some embodiments, the server 125 achieves the above assignment of different portions of the décor accessory to different colors by representing the décor accessory using a number of attributes (e.g., the zig-zag lines on the first cushion 330 can be a feature attribute of the first cushion 330) and mapping different attributes to different colors.

Figure 4A:
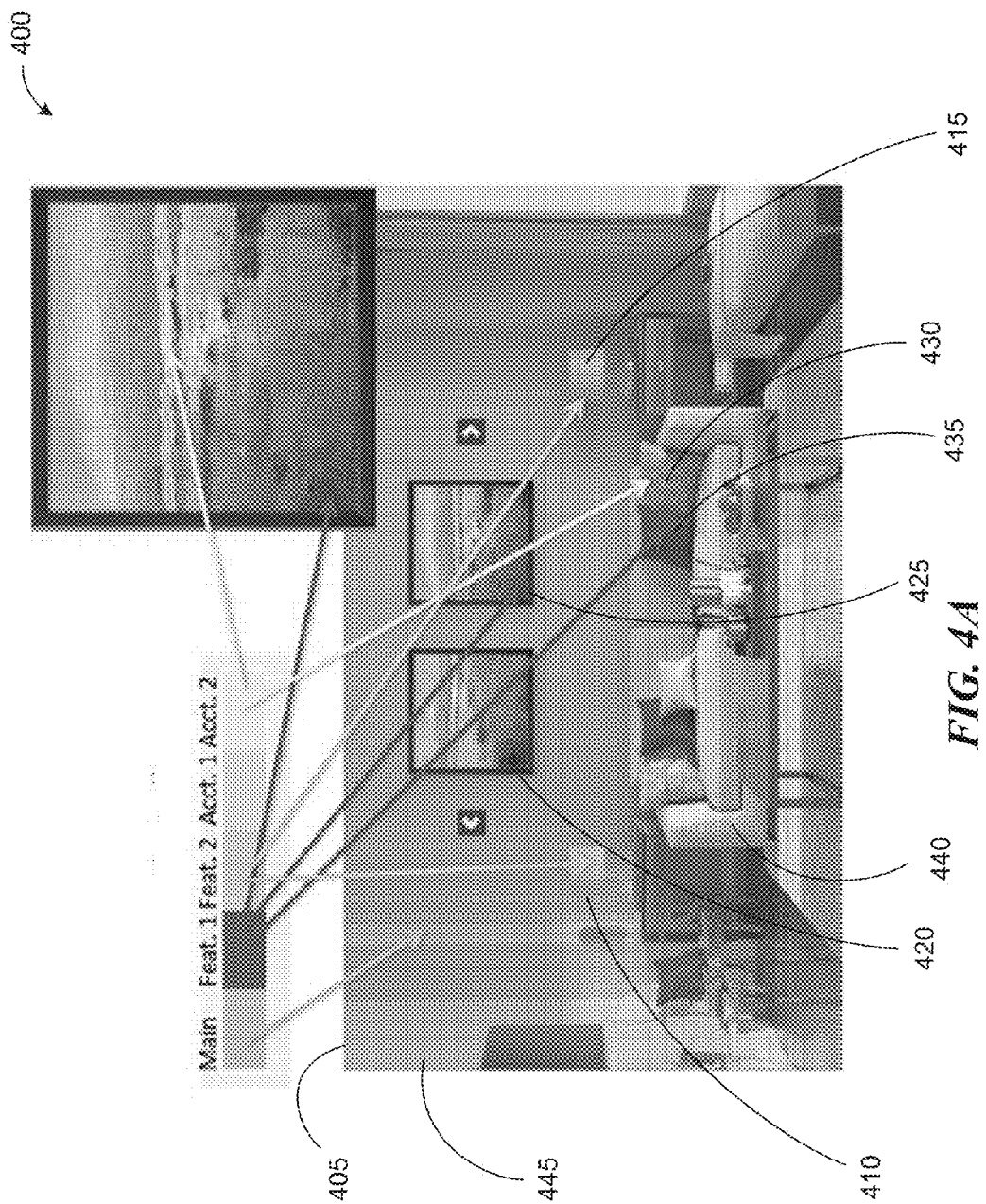
FIG. 4A is an example illustrating a mapping of décor accessories in an image of a setting to colors of a color palette, consistent with various embodiments.

FIG. 4A is an example illustrating a first mapping 400 of décor accessories in an image of a setting to colors of a color palette, consistent with various embodiments. In some embodiments, the first mapping 400 may be generated in the environment 100 of FIG. 1 and using the color palette 205 of FIG. 2 and using the image of the setting 305 of FIG. 3. The server 125 maps the décor accessories in the image of the setting 305 (e.g., that is input by the user 105) with the colors from the color palette 205 based on the harmony distribution rules and generates an updated image of the setting 405. In some embodiments, the updated image of the setting 145 of FIG. 1 is similar to the updated image of the setting 405.

As described above, the harmony distribution rules specify the assignment of a particular décor accessory to a color group based on various criteria. In the example 400, consider that the harmony-distribution rules define the assignment based on an area of the image of the setting 305. Further, consider that the harmony-distribution rules specify that "60%" of the room is to be assigned to a first color group, e.g., main color group 210 of the color palette 205, "30%" of the room to a second color group, e.g., the feature color group 215, and "10%" of the room to a third color group, e.g., accent color group 220. In some embodiments, the main color group 210 is a group that includes a color that is applied to an image region that occupies the most percentage of the area of the image of the setting 305 among all the image regions in the image of the setting 305.

As described above, the server 125 has or can determine or derive the attributes of the décor accessories (e.g., area occupied by a décor accessory) in the image of the setting 305. The server 125 can then identify the image sections, i.e., décor accessories, in the image of the setting 305 that occupy the specified percentages of the area of the overall image of the setting 405 and classifies them into a main image region, a feature image region or an accent image region. For example, the server 125 identifies the wall 345 as occupying "60%" of the overall area of the image of the setting 305, and classifies the wall 345 into the main image region. Similarly, the server 125 identifies some image sections, e.g., the lamps 310 and 315, some of the cushions, e.g., cushion 330, and the sofa 340 as occupying "30%" of the overall area of the image of the setting 305, and classify these image sections into the feature image region. Similarly, the server 125 identifies some image sections, e.g., artwork 325 and cushion 335, as occupying "10%" of the overall area of the image of the setting 305, and classifies these image sections into the accent image region.

The server 125 then assigns the corresponding image region to the color group to generate the first mapping 400. For example, the server 125 assigns the main image region to the main color group 210, the feature image region to the feature color group 215, and the accent image region to the accent color group 220. If the assigned color group has more than one color, the server 125 can assign the image sections in the image region to the colors in the assigned color group in many ways, e.g., randomly, a specified number of image sections to a particular color, a specified number of image sections to each of the colors in the color group. For example, the feature color group 215 includes two colors. Some of the image sections in the feature image region, e.g., lamps 310 and 315, are assigned to one of the two colors and some of the image sections, e.g., the artwork 325, are assigned to the other of the two colors.

After the first mapping 400 is completed, the server 125 can generate the updated image of the setting 405 in which the décor accessories, e.g., table lamps 410 and 415, art works 420 and 425, a first cushion 430 and a second cushion 435, a sofa 440 and the wall 445, are generated with the colors assigned to the image sections they correspond based on the first mapping 400.

In some embodiments, the server 125 generates the updated image of the setting 405 using CGI techniques. In some embodiments, the server 125 generates each of the décor accessories in the updated image of the setting 405 as a separate layer, e.g., to allow the attributes of a décor accessory to adjusted by the user 105 manually. For example, the user 105 can manually change one or more of the color, size, position, etc. of a particular décor accessory.

In some embodiments, generating the updated image of the setting 405 using CGI enables the presence and size of décor accessories in the image of the setting to be adjusted precisely—i.e., the server 125 can control image sections in terms of their aesthetic appearance. The server 125 can also adjust the precise coloring of any image section whilst maintaining photorealistic rendering of the décor accessories (e.g., colors can also appear in reflections of the décor accessories, not just in the décor accessories).

Figure 4B:
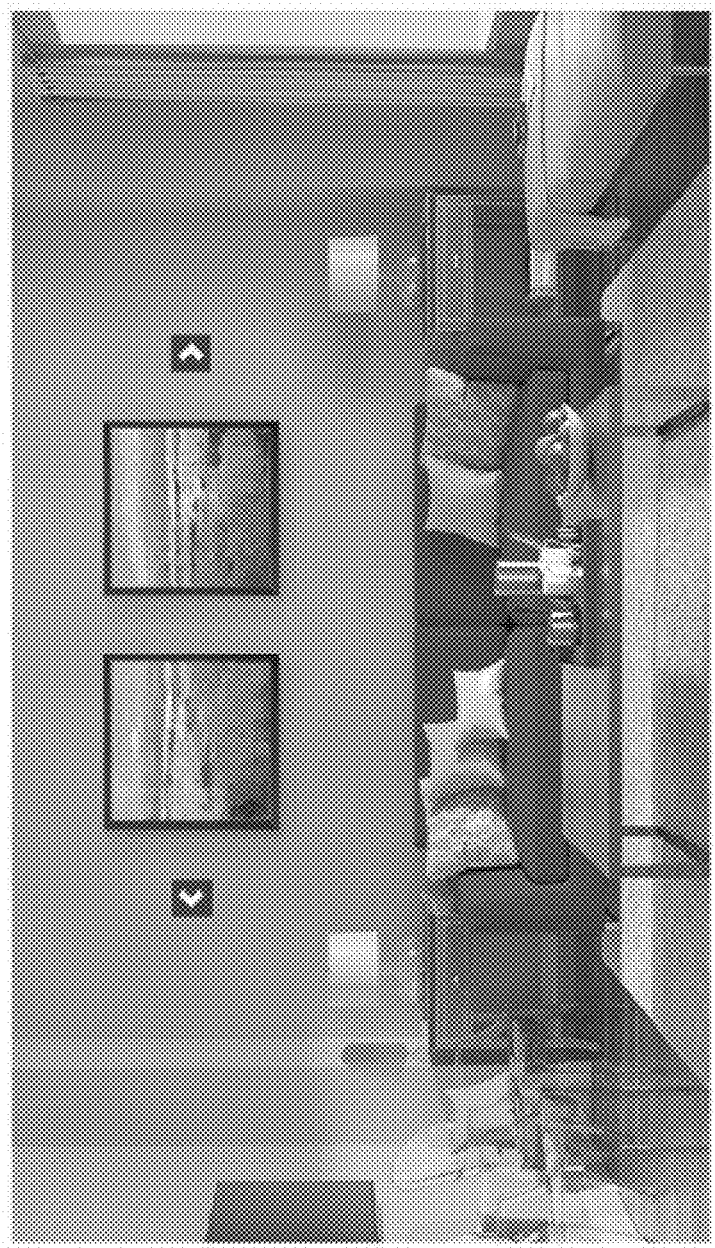
FIG. 4B illustrates an example of a second mapping of décor accessories in an image of a setting of FIG. 3 to colors of a color palette, consistent with various embodiments.

FIG. 4B illustrates an example of a second mapping 450 of décor accessories in an image of a setting of FIG. 3 to colors of a color palette, consistent with various embodiments. In some embodiments, the server 125 can generate many mappings and therefore, many updated images of the setting. Different mappings define different assignments of the image sections to the colors. However, each of the mappings abides by the harmony distribution rules. For example, in a first mapping, a first image region can be assigned to a first color group and in a second mapping the first image region can be assigned to a second color group. In another example, in a first mapping, an image section in a particular image region can be assigned to a first color from the color group assigned to the image region and in a second mapping, the image section can be assigned a second color from the image region. In yet another example, in a first mapping, a particular image region can be classified into a first image region and in a second mapping, the particular image region can be classified in to a second image region.

In the second mapping 450, the sofa is assigned to a different color of the feature color group from the color of the feature color group assigned in the first mapping 400. Further, the lamps are assigned to the accent color group 220 instead of the feature color group 215 as previously assigned in the first mapping 400.

Figure 4C:
FIG. 4C illustrates an example of a third mapping of décor accessories in an image of a setting of FIG. 3 to colors of a color palette, consistent with various embodiments.

FIG. 4C illustrates an example of a third mapping 475 of décor accessories in an image of a setting of FIG. 3 to colors of a color palette, consistent with various embodiments. In the third mapping 475, the sofa is assigned to the accent color group 220 instead of the feature color group 215 as previously assigned in the first mapping 400 and the second mapping 450.

Figure 5:
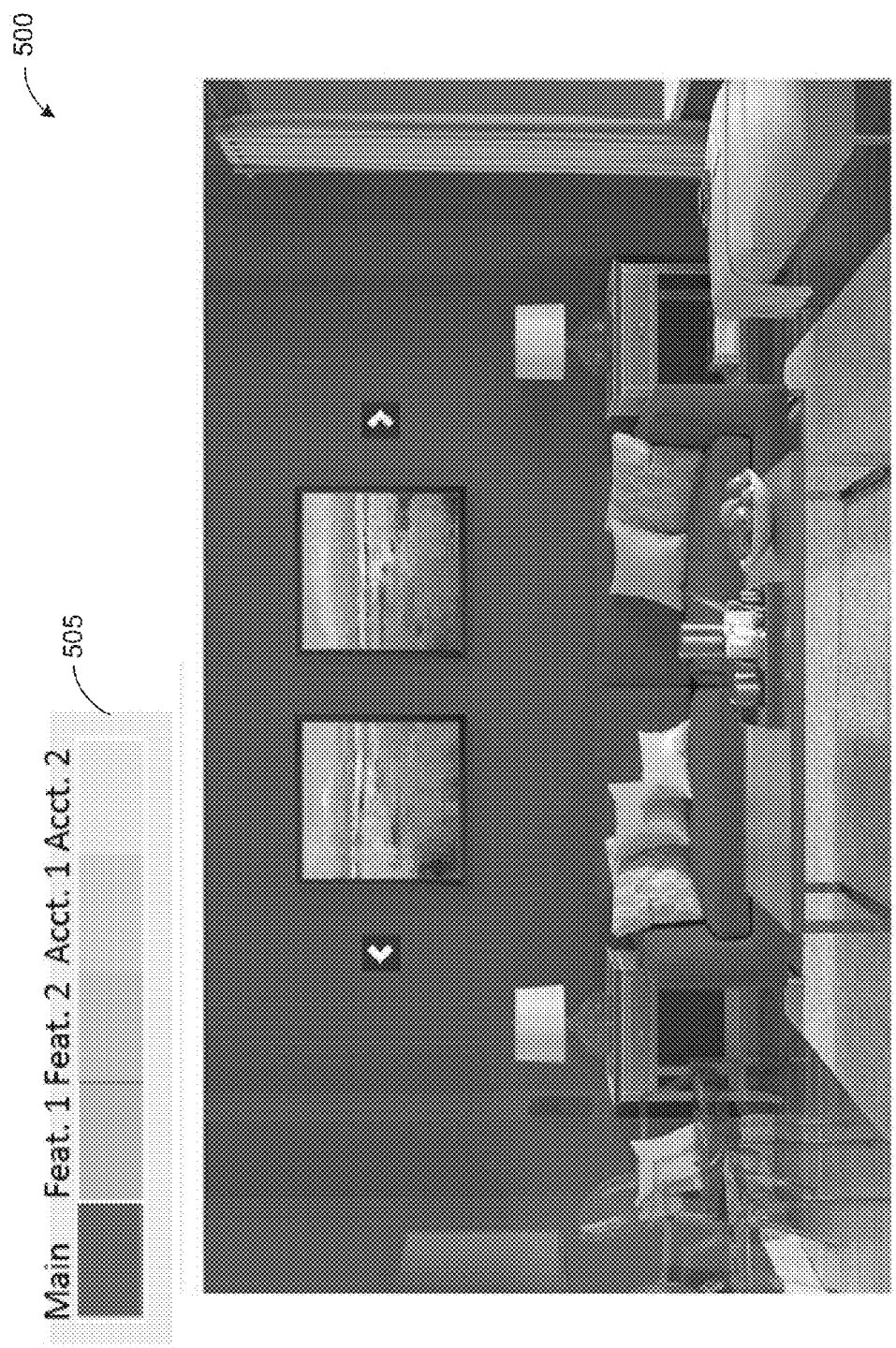
FIG. 5 is an example of a fourth mapping of décor accessories in an image of a setting of FIG. 3 to colors of a color palette generated based on a décor scheme, consistent with various embodiments.

FIG. 5 is an example of a fourth mapping 500 of décor accessories in an image of a setting of FIG. 3 to colors of a color palette generated based on a décor scheme, consistent with various embodiments. The harmony distribution rules can also define the mappings based on décor schemes, e.g., mood of a person. In some embodiments, the DHS application classifies the color palettes based on a number of décor schemes such as a mood of a person, a theme, an occasion, a travel theme, fashion era, etc. For example, the color palettes can be categorized based on the moods such as "calm," "calm and relaxing," "bold," "bold and confident," "happy," "party," "romantic," etc. When the user 105 selects a particular décor scheme, e.g., a particular mood, the server 125 presents one or more color palettes belonging to the particular mood. The user 105 may choose one of those color palettes, which the server 125 may then use for generating the fourth mapping 500.

As illustrated in FIG. 5, the fourth mapping 500 is generated based on a color palette 505 that is categorized as "bold and confident." The harmony rule engine 130 can be configured to apply the décor scheme-based rules in addition to the area-based harmony distribution rule or as an alternative to the area-based harmony distribution rule. That is, the server 125 can generate the fourth mapping 500 based on the area-based harmony distribution rule and/or the décor scheme-based rules. In the example of FIG. 5, the fourth mapping 500 is generated by applying the décor scheme-based rules in addition to the area-based harmony distribution rule. The server 125 can classify the bold color from the color palette 505 as the main color, and assign the main color to the main image region, e.g., an image region that occupies the most area of the room, thereby generating the fourth mapping 500 that is perceived as "bold and confident" by the user 105. Typically, a bold color palette can include bright and/or bold colors such as "red," which can be classified as a main color. In the fourth mapping 500, the bold color is applied to the wall and the sofa in the room, which together occupy the most area in the image of the setting.

Figure 6:
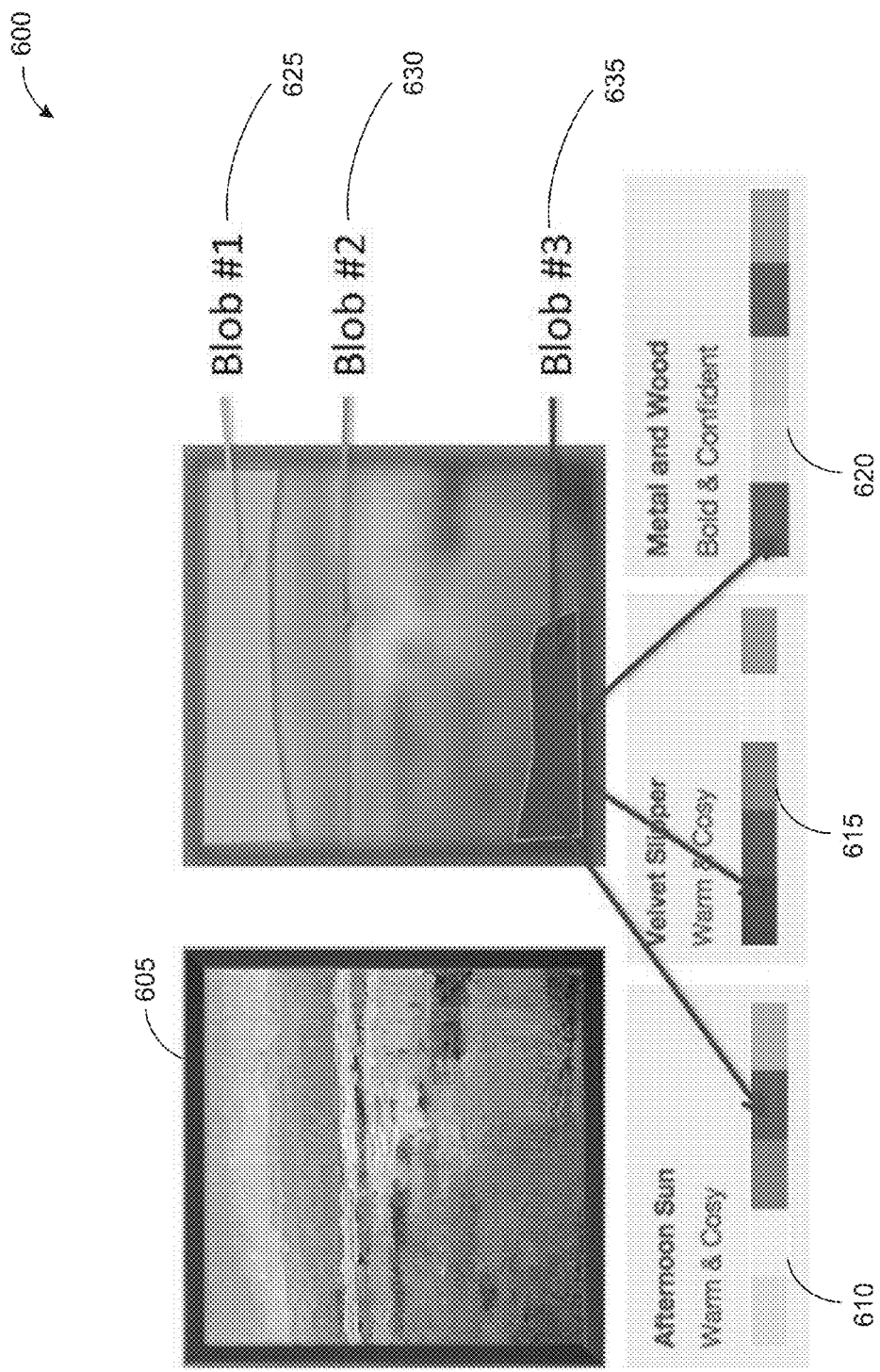
FIG. 6 is an example illustrating finding color palettes that are related a décor accessory, consistent with various embodiments.

FIG. 6 is an example 600 illustrating finding color palettes that are related a décor accessory, consistent with various embodiments. The example 600 can be implemented in environment 100 of FIG. 1. In some cases, the user 105 may not know what color palette to choose, but might already have one or more décor accessories, e.g., in the room, based on the colors of which the user 105 would like to harmonize the other décor accessories of the room. That is, the user 105 may want a color palette suggestion based on a décor accessory 605, e.g., which is present in the room or which is of interest to the user 105. The server 125 can analyze the décor accessory 605 using various image analysis techniques, e.g., color-blob detection, to identify characteristic colors in the décor accessory 605 and retrieve one or more color palettes, e.g., color palettes 610, 615 and 620, that are related to the characteristic colors. The user 105 may choose one of the retrieved color palettes and request the server 125 to generate an updated image of the setting, e.g., as described at least with reference to FIG. 1.

In some embodiments, the server 125 determines the characteristic colors according to rules based on a décor accessory being analyzed. For example, in the case of an artwork such as the décor accessory 605, the server 125 can analyze the décor accessory 605 to extract colors that are visuo-perceptually meaningful to users. In some embodiments, visuoperceptual ability is a component of visual perception that enables recognition of objects based on their form, pattern, and color. The server 125 can use blob detection techniques to identify blobs of the characteristic colors. In some embodiments, blob detection refers to mathematical methods that are aimed at detecting regions in a digital image that differ in properties, such as brightness or color, compared to areas surrounding those regions. A blob can be a region of a digital image in which some properties are constant or vary within a prescribed range of values; all the points in a blob can be considered in some sense to be similar to each other.

For example, in the décor accessory 605, the server 125 can identify the blobs, e.g., first blob 625, second blob 630 and a third blob 635 as characteristic colors based on the blob detection technique. Further, the server 125 could further characterize the second blob 630 and the third blob 635 as "accent" colors, which are colors that can be visually prominent in some way. In some embodiments, the server 125 can determine that a particular blob classifies into a particular color group based on the RGB value of the color in the particular blob. The server 125 can then use a color of one or more of the blobs to find color palettes with the color of those one or more blobs. For example, the server 125 use a characteristic color that is considered dominant among the colors of the blobs to search for color palettes having the same or a related color. In some embodiments, the server 125 includes rules that identify colors that are related to a particular color. The server 125 can perform the search in the storage system 135 or at other third-party locations such as the servers 150.

The search for the color palettes based on the characteristic color can return a wide variety of color palettes. For example, some color palettes can have the characteristic color in a first color group, e.g., the main color group, some color palettes can have the characteristic color in a second color group, e.g., the feature color group, and some color palettes can have the characteristic color in a third color group, e.g., the accent color group. In the example 600, the server 125 has returned the color palettes 610, 615 and 620 based on the color of the third blob 635. However, these color palettes vary widely because the color of the third blob 635 appears in the main color group in two color palettes, appears in the accent color group in another palette and therefore, can greatly affect the overall color scheme in the palette.

In some embodiments, the search for the color palettes based on the characteristic color can be performed based on some criteria that returns color palettes that are likely to be of more interest to the user 105 rather than returning widely varying color palettes. A number of criteria can be used to perform a more focused search. For example, the user 105 can specify a décor scheme, e.g., a mood, the user 105 is interested and the server 125 can search for color palettes under the specified décor scheme.

In another example, the server 125 searches for color palettes with colors of as many of the blobs as possible, e.g., find a color palette that has all the blobs 625-635 in it.

In yet another example, the server 125 can search for a first set of color palettes that have similar color-wheel-theory schemes, e.g., if the blobs 625-635 are within an analogous scheme, then search, the first set of color palettes, for a second set of color palettes that have a specified key color and a similar scheme.

In some embodiments, the DHS application facilitates finding of décor products that can be used to achieve the look in the room as indicated by an updated image of the setting. In some embodiments, to facilitate the searching of the décor products, the DHS application stores the décor products, e.g., in the storage system 135, by indexing the décor products by their attributes, e.g., color of the blobs. The server 125 can search for the décor products by using the color index. For example, to find a read cushion as part of a red accent image section, the server 125 can search for cushions with a similar red color, either as a main color, e.g., for a bold look, or as a minor color such as a feature color or an accent color, e.g., for subtle accent look.

Figure 7:
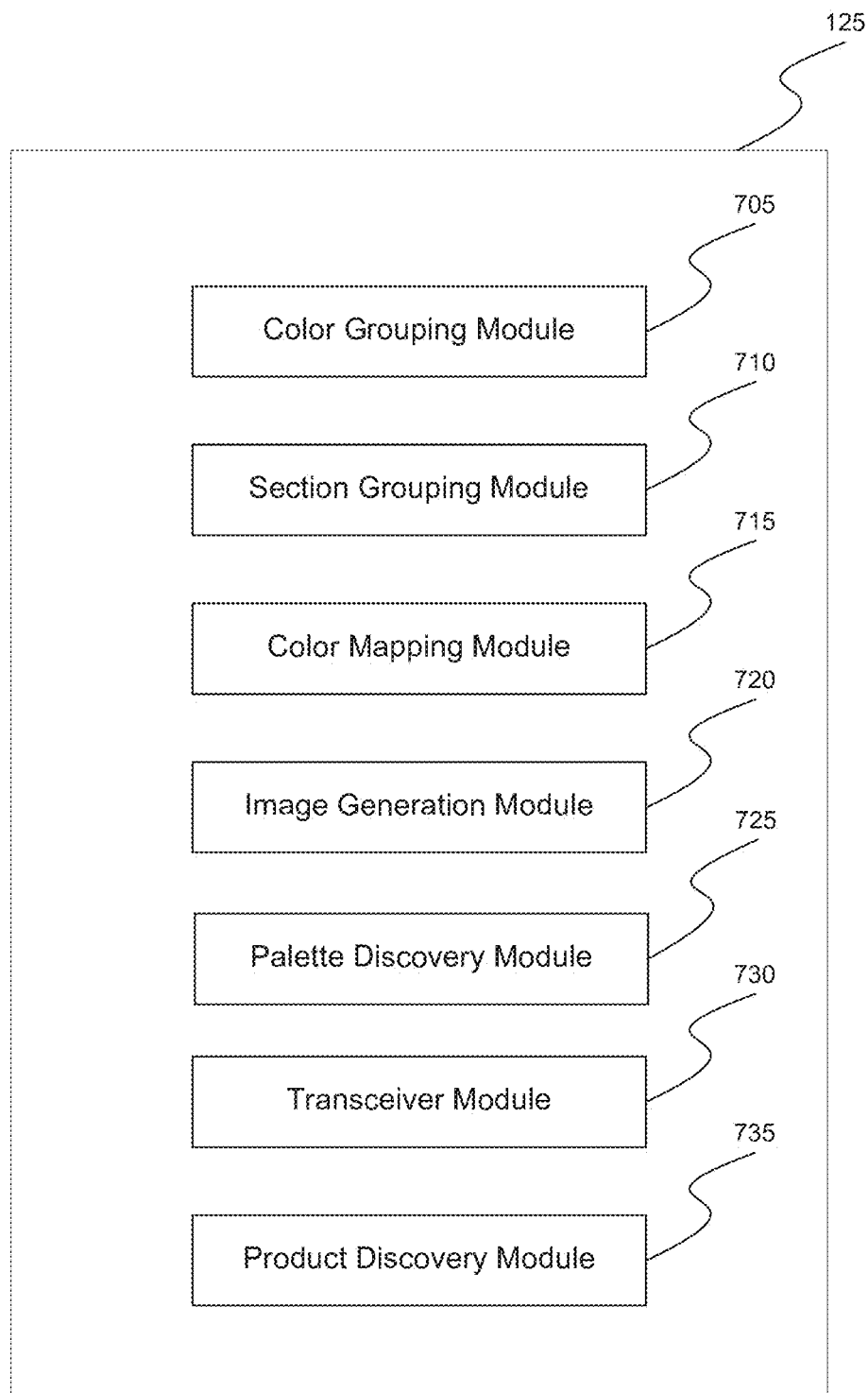
FIG. 7 is a block diagram of a server of FIG. 1 in which the DHS application can be implemented, consistent with various embodiments.

FIG. 7 is a block diagram of a server of FIG. 1 in which the DHS application can be implemented, consistent with various embodiments. The server 125 includes a transceiver module 730 that can receive and/or transmit data, e.g., color palettes, images of the settings from and/or to the user, e.g., user 105. The server 125 includes a color grouping module 705 that can classify the colors in a color palette into a number of color groups, e.g., as described at least with reference to FIGS. 1, 2A and 2B.

The server 125 includes an section grouping module 710 that can analyze an image of a setting, e.g., image of the setting 120, to identify the décor accessories in the image of the setting as corresponding image sections. The section grouping module 710 classifies the image section into image regions based on the harmony distribution rules, e.g., as described at least with reference to FIGS. 1 and 4A. In some embodiments, the section grouping module 710 interacts with the harmony rule engine 130 to classify the image sections into the image regions. In some embodiments, the section grouping module 710 classifies the image sections into as many image regions as the number of color groups.

The server 125 includes a color mapping module 715 that can generate a mapping of the image regions to the corresponding color groups, e.g., as described at least with reference to FIGS. 1 and 4A. The color mapping module 715 maps each of the image sections, i.e., a décor accessory to which the image section corresponds, in an image region to a color in the color group assigned to the image region. If the color group has more than one color, the color mapping module 715 maps each of the image sections to one of the colors based on various criteria, e.g., randomly.

The server 125 includes an image generation module 720 that can generate an image at a client device, e.g., as described at least with reference to FIGS. 1 and 4A. Examples of the image can include an image of a color palette, an image of a setting, and an updated image of the setting. In some embodiments, the image generation module generates the image using CGI techniques. In some embodiments, the image generation module generates the image as a picture or photograph.

The server 125 includes a palette discovery module 725 that can search for or suggest or present color palettes to the user 105, e.g., as described at least with reference to FIGS. 1 and 6. For example, the palette discovery module 725 can search for a set of palettes based on a décor scheme, e.g., mood, specified by the user 105. In another example, the palette discovery module 725 can search for a set of palettes based on a representation of a décor accessory input by the user 105. For example, if the user 105 inputs an image of the décor accessory, the palette discovery module 725 can analyze the décor accessory using various image analysis techniques, e.g., blob detection, to identify one or more characteristic colors in the décor accessory and generate a set of color palettes to the user that includes one or more of the characteristic colors. The palette discovery module 725 can also analyze the metadata of the image of the décor accessory to extract various attributes of the décor accessory, e.g., attributes that specify the colors of the décor accessory. The palette discovery module 725 can also analyze a décor accessory based on information such as a customer review of the décor accessory, or a product description, e.g., using natural language processing, to extract the attributes of the décor accessory.

In some embodiments, the palette discovery module 725 can also generate color palettes based on various criteria, specifications, rules, themes, etc. For example, the palette discovery module 725 generates a color palette based on a mood of person. In another example, the palette discovery module 725 generates a color palette based on one or more colors input by the user 105.

The server 125 includes a product discovery module 735 that can search for a décor product that matches with a particular décor accessory in an image of a setting, e.g., as described at least with reference to FIG. 1. In some embodiments, the décor products stored in the storage system 135 are tagged with one or more of their attributes, e.g., an ID of the décor product, a color, a size, a manufacturer, a retailer, and a type. The product discovery module 735 can use one or more of the attributes of the particular décor accessory in the image of the setting to search for décor products whose attributes match with that of the particular décor accessory.

Note that some or all the modules 705-735 of the server 125 can be implemented in a single server computing device or can be distributed over a number of computing devices in a distributed environment. Further, one or more of the modules 705-735 can be implemented in more than one server computing device. Furthermore, one or more of the modules 705-735 can be implemented in a client portion of the DHS application that is installed at a client, e.g., client 110. The client portion of the DHS application installed at the client interacts with a server portion of the DHS application implemented on the server 125 or one or more server computing devices in the distributed to realize the functionality of the DHS application.

Figure 8:
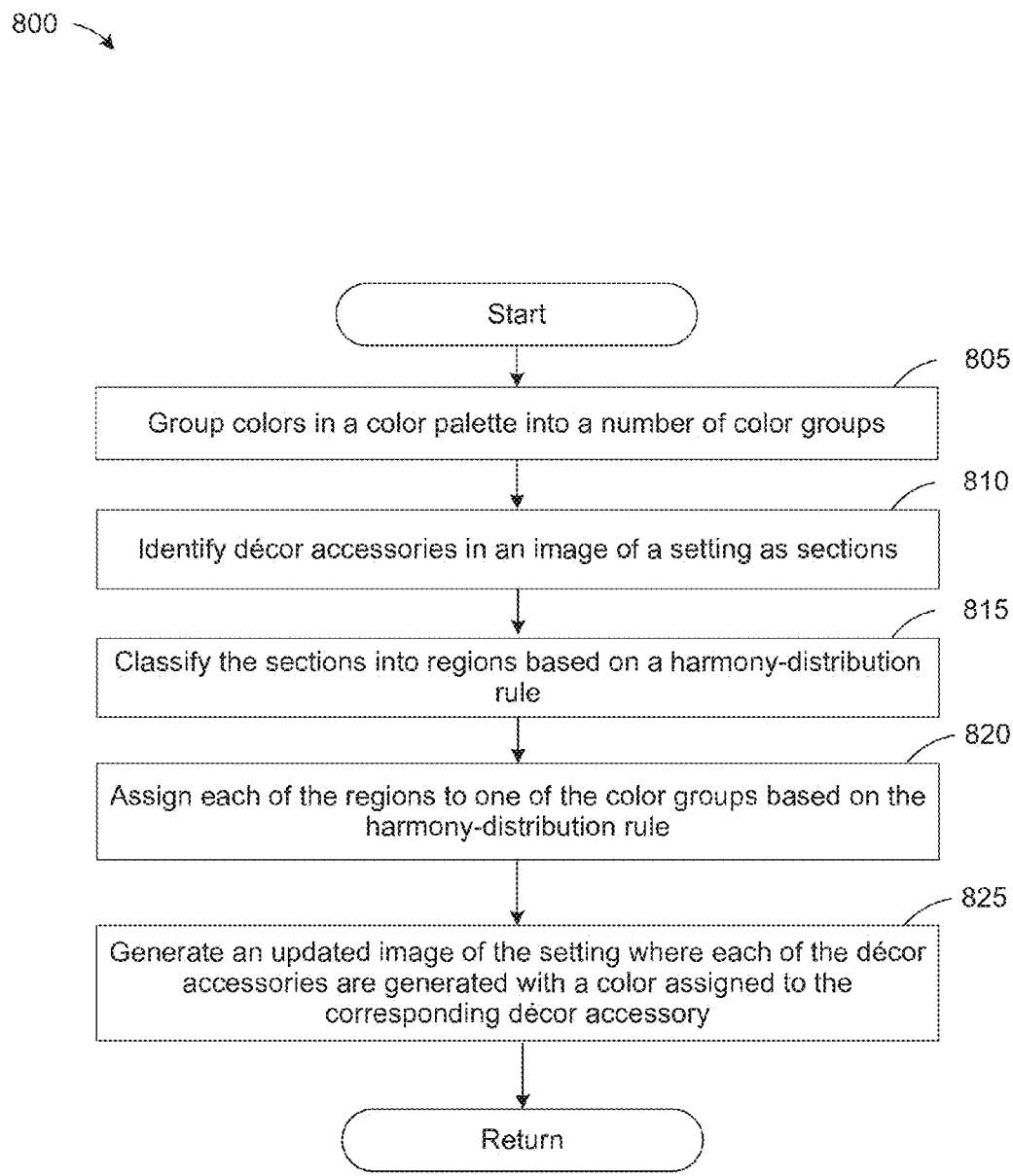
FIG. 8 is a flow diagram of a process for mapping décor accessories in an image of a setting to colors in a color palette, consistent with various embodiments.

FIG. 8 is a flow diagram of a process 800 for mapping décor accessories in an image of a setting to colors in a color palette, consistent with various embodiments. The process 800 may be executed in an environment 100 of FIG. 1. At block 805, the color grouping module 705 of the server 125 classifies the colors in a color palette into a number of color groups, e.g., as described at least with reference to FIGS. 1, 2A and 2B. For example, as described with reference to FIGS. 2A and 2B, the color grouping module 705 can classify a five color palette into a main color group 210 having one of the five colors, a feature color group having two of the five colors, and an accent color group having the remaining two colors.

At block 810, the section grouping module 710 identifies the décor accessories in an image of a setting, e.g., image of the setting 120 or image of the setting 305, as a number of image sections. In some embodiments, each of the décor accessories corresponds to an image section. In some embodiments, a portion of a décor accessory corresponds to an image section. The section grouping module 710 analyzes a representation of the setting to identify various décor accessories, attributes of the décor accessories, etc. For example, if the setting is represented as an image, the section grouping module 710 analyzes the image of the setting using various image analysis techniques and identifies the décor accessories in the image of the setting. For example, if the image of the setting is generated using CGI, the server 125 can determine or derive the various attributes of the décor accessories, e.g., size, area, position of the décor accessory in the image of the setting, by analyzing the image of the setting based on CGI techniques. In the image of a setting 305, the section grouping module 710 can identify the décor accessories, e.g., table lamps 310 and 315, art works 320 and 325, a first cushion 330 and a second cushion 335, a sofa 340 and a wall 345 as a number of image sections.

If the setting is represented in other formats, e.g., as text, the section grouping module 710 analyzes the text to identify the décor accessories and/or their attributes, their arrangement in the setting, etc.

At block 815, the section grouping module 710 can classify the image section into image regions based on the harmony distribution rules, e.g., as described at least with reference to FIGS. 1 and 4A. In some embodiments, the section grouping module 710 interacts with the harmony rule engine 130 to classify the image sections into the image regions. In some embodiments, the section grouping module 710 classifies the image sections into as many image regions as the number of color groups.

For example, consider that the harmony-distribution rules specify that "60%" of the room is to be assigned to a first color group, e.g., main color group 210 of the color palette 205, "30%" of the room to a second color group, e.g., the feature color group 215, and "10%" of the room to a third color group, e.g., accent color group 220. The section grouping module 710 can determine using the attributes of the décor accessories the image sections, i.e., décor accessories, in the image of the setting 305 that occupy the specified percentages of the area of the overall image of the setting 405. For example, as described at least with reference to FIG. 4A, the section grouping module 710 can identify the wall 345 as occupying "60%" of the overall area of the image of the setting 305, and classify the wall 345 into the main image region. Similarly, the section grouping module 710 can assign the image sections, e.g., the lamps 310 and 315, some of the cushions, e.g., cushion 330, and the sofa 340 into the feature image region, and the image sections, e.g., artwork 325, some of the cushions, e.g., cushion 335, into the accent image region.

At block 820, the color mapping module 715 assigns each of the image regions to a distinct one of the color groups based on the harmony distribution rules. For example, as described at least with reference to FIG. 4A, the color mapping module 715 maps the main image region to the main color group 210, the feature image region to the feature color group 215, and the accent image region to the accent color group 220. If the assigned color group has more than one color, the color mapping module 715 can assign the image sections in the image region to the colors in the assigned color group in many ways, e.g., randomly, a specified number of image sections to a particular color, a specified number of image sections to each of the colors in the color group. For example, the feature color group 215 includes two colors. Some of the image sections in the feature image region, e.g., lamps 310 and 315, are assigned to one of the two colors and some other image sections in the image region, e.g., the artwork 325, are assigned to the other of the two colors.

At block 825, the image generation module 720 generates a representation of the mapping, e.g., an updated image of the setting in which the décor accessories are generated with the colors to which the image sections are mapped. For example, the image generation module 720 generates the updated image of the setting 405 in which the décor accessories, e.g., table lamps 410 and 415, art works 420 and 425, a first cushion 430 and a second cushion 435, a sofa 440 and the wall 445, are generated with the colors assigned to the image sections based on the first mapping 400. In some embodiments, the image generation module 720 generates the updated image of the setting using CGI techniques. In some embodiments, the image generation module 720 generates the mapping in other formats, e.g., a list (or a recipe), which specify which of the décor accessories should be colored with which colors, which portion of a décor accessory has to be colored with which color. For example, the recipe can indicate that the room should have colors from a particular color palette of a particular décor/color scheme, "x %" of the rug should contain palette "color 1," "y %" of the couch should contain "color 2."

Figure 9:
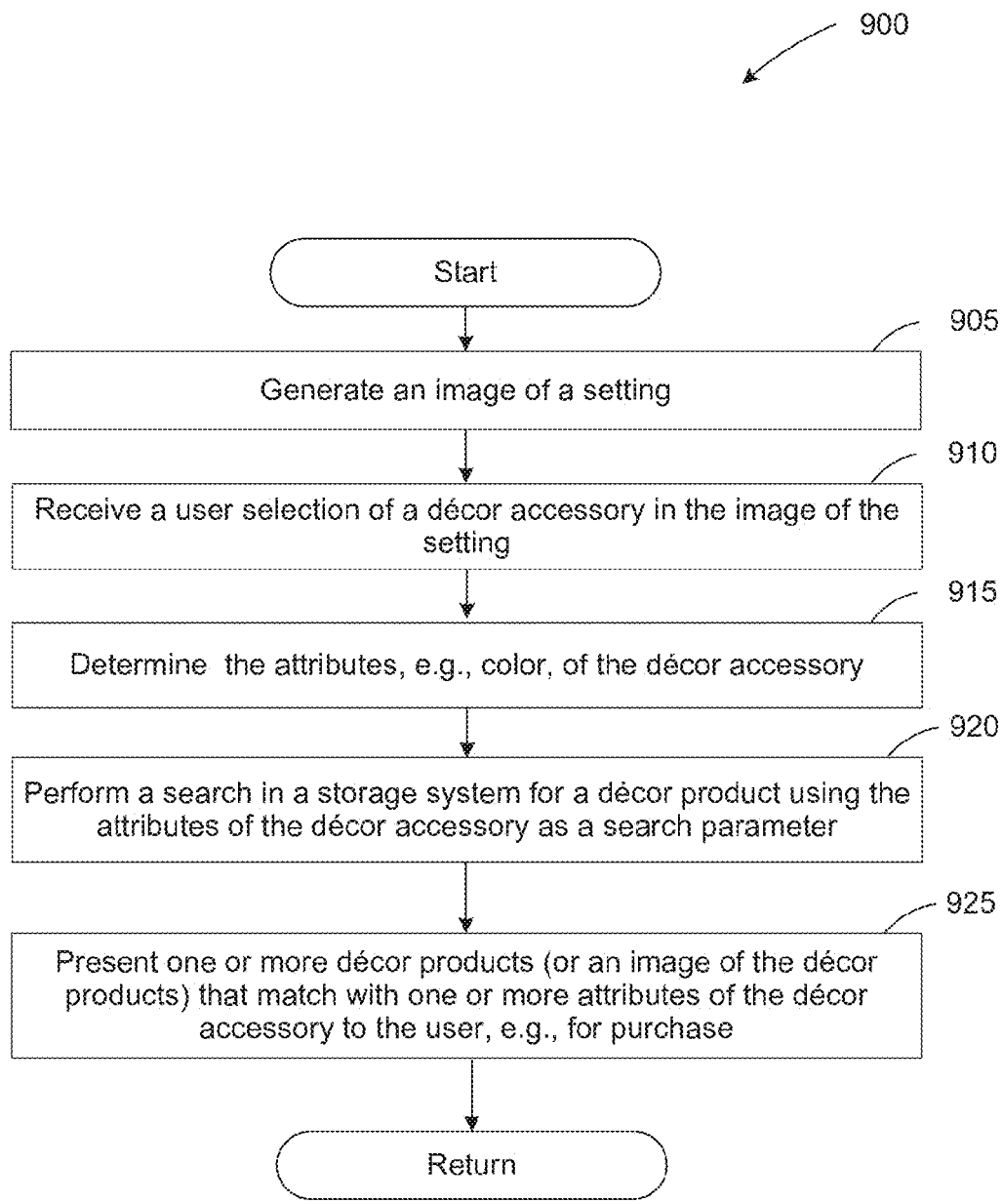
FIG. 9 is a flow diagram of a process for searching a décor product represented in an image of a setting, consistent with various embodiments.

FIG. 9 is a flow diagram of a process 900 for searching a décor product represented in an image of a setting, consistent with various embodiments. The process 900 may be executed in an environment 100 of FIG. 1. At block 905, the image generation module 720 generates an image of a setting, e.g., an image of the setting 305 or updated image of the setting 405, at a client, e.g., client 110. In some embodiments, the image of the setting is generated based on a mapping, where the décor accessories in the image of the setting are generated with a color assigned from a color palette based on a harmony distribution rule.

At block 910, the transceiver module 730 receives a user selection of a particular décor accessory in the image of the setting. For example, the user 105 can specify a décor accessory such as a lamp 410 from the updated image of the setting 405.

At block 915, the product discovery module 735 determines the attributes of the particular décor accessory, e.g., an ID of the décor accessory, a color, a size, a manufacturer, a retailer, a type, an area occupied by the décor accessory in the image of the setting. In some embodiments, the attributes of the décor accessories of the image of the setting are stored as metadata of the image of the setting. The product discovery module 735 can determine the attributes of the particular décor accessory in many ways. For example, a user such as an administrator who inputs the images of settings can input the information regarding the attributes of the décor accessories. In another example, if the image of the setting 120 is input by the user 105, the product discovery module 735 can analyze the image of the setting 120 to determine at least some of the attributes and/or request the user 105 to input information regarding at least some of the attributes. In yet another example, if the images of the settings are generated using CGI, the product discovery module 735 can determine or derive the various attributes of the décor accessories by analyzing the image of the setting based on CGI techniques.

At block 920, the product discovery module 735 performs a search for the décor products that match with the user selected décor accessory. In some embodiments, the décor products stored in the storage system 135 are tagged with one or more of their attributes, e.g., an ID of the décor product, a color, a size, a manufacturer, a retailer, and a type.

The product discovery module 735 can use one or more of the attributes of the user selected décor accessory to search for décor products who's one or more attributes match with that of the user selected décor accessory.

At block 925, the product discovery module 735 can present the retrieved décor products, e.g., images of the décor products, to the user 105 at the client 110. The user 105 can then purchase one or more of the décor products.

Figure 10:
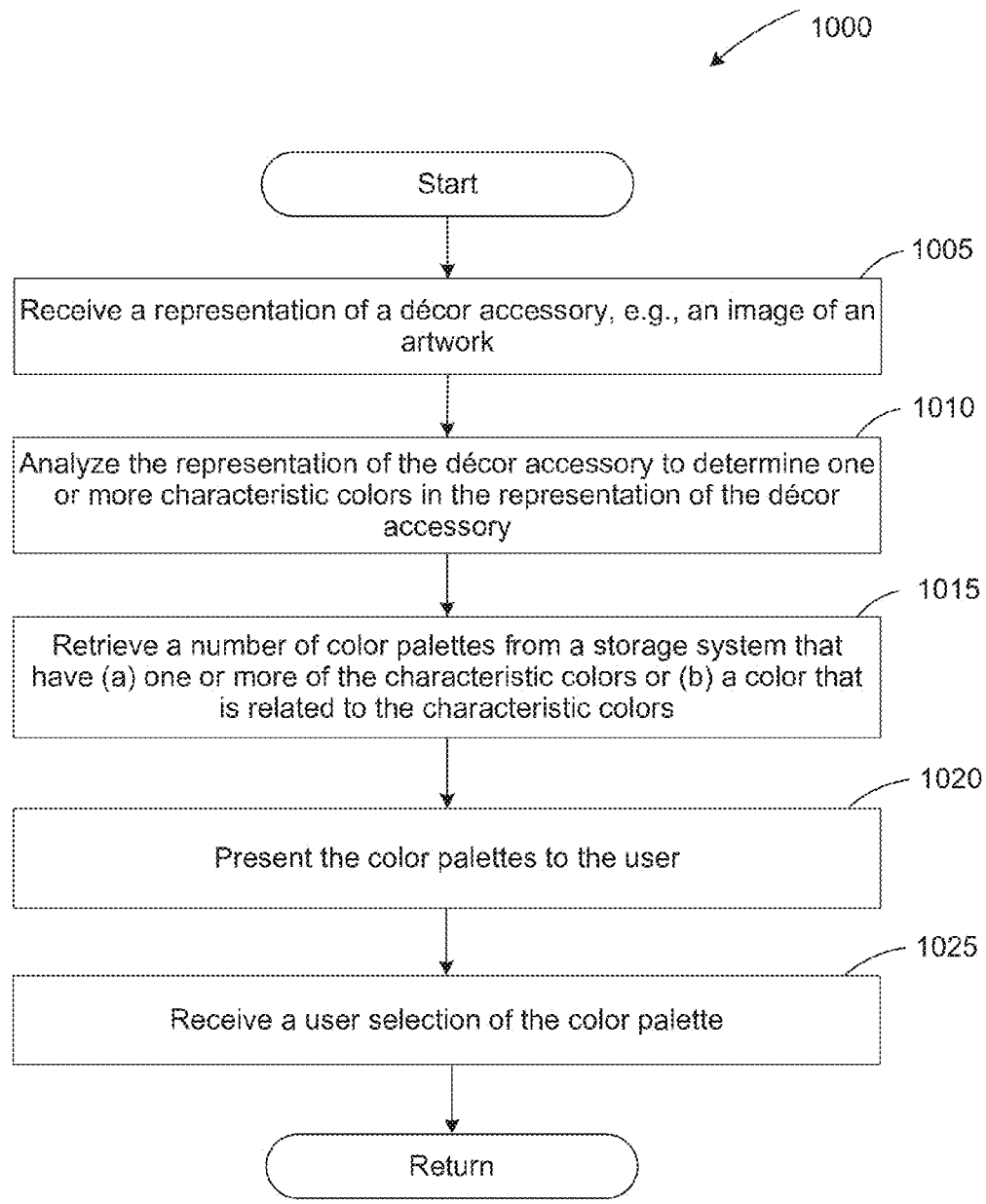
FIG. 10 is a flow diagram of a process for presenting a set of color palettes to a user based on a décor accessory, consistent with various embodiments.

FIG. 10 is a flow diagram of a process 1000 for presenting a set of color palettes to a user based on a décor accessory, consistent with various embodiments. The process 1000 may be executed in the environment 100 of FIG. 1. At block 1005, the transceiver module 730 receives an image of the décor accessory, e.g., décor accessory 605, from a client device associated with a user, e.g., from client 110 associated with the user 105.

At block 1010, the palette discovery module 725 can analyze the décor accessory using various image analysis techniques, e.g., color-blob detection as described at least with reference to FIG. 6, to identify characteristic colors in the décor accessory. For example, in the décor accessory 605, the palette discovery module 725 can identify the blobs, e.g., first blob 625, second blob 630 and a third blob 635 as characteristic colors based on the blob detection technique.

At block 1015, the palette discovery module 725 performs a search to retrieve a set of color palettes that have one or more of the characteristic colors. The palette discovery module 725 can perform the search in the storage system 135 or at other third-party locations such as the servers 150.

In some embodiments, the search can return color palettes that vary widely. For example, some color palettes can have the characteristic color in a first color group, e.g., the main color group, some color palettes can have the characteristic color in a second color group, e.g., the feature color group, and some color palettes can have the characteristic color in a third color group, e.g., the accent color group. These widely varying color palettes can greatly affect the overall color scheme in the palette. In some embodiments, the palette discovery module 725 can perform a more focused search that obtains a set of color palettes that is more likely to be of interest to the user 105. For example, the user 105 can specify a décor scheme, e.g., a mood, the user 105 is interested and the palette discovery module 725 search for color palettes under the specified décor scheme.

At block 1020, the image generation module 720 presents the retrieved set of color palettes to the user 105 at the client 110.

At block 1025, the transceiver module 730 receives a user selection of a color palette from the set of color palettes. The server 125 can use the received color palette for generating the mapping, e.g., as described at least with reference to FIGS. 1 and 4A.

Figure 11:
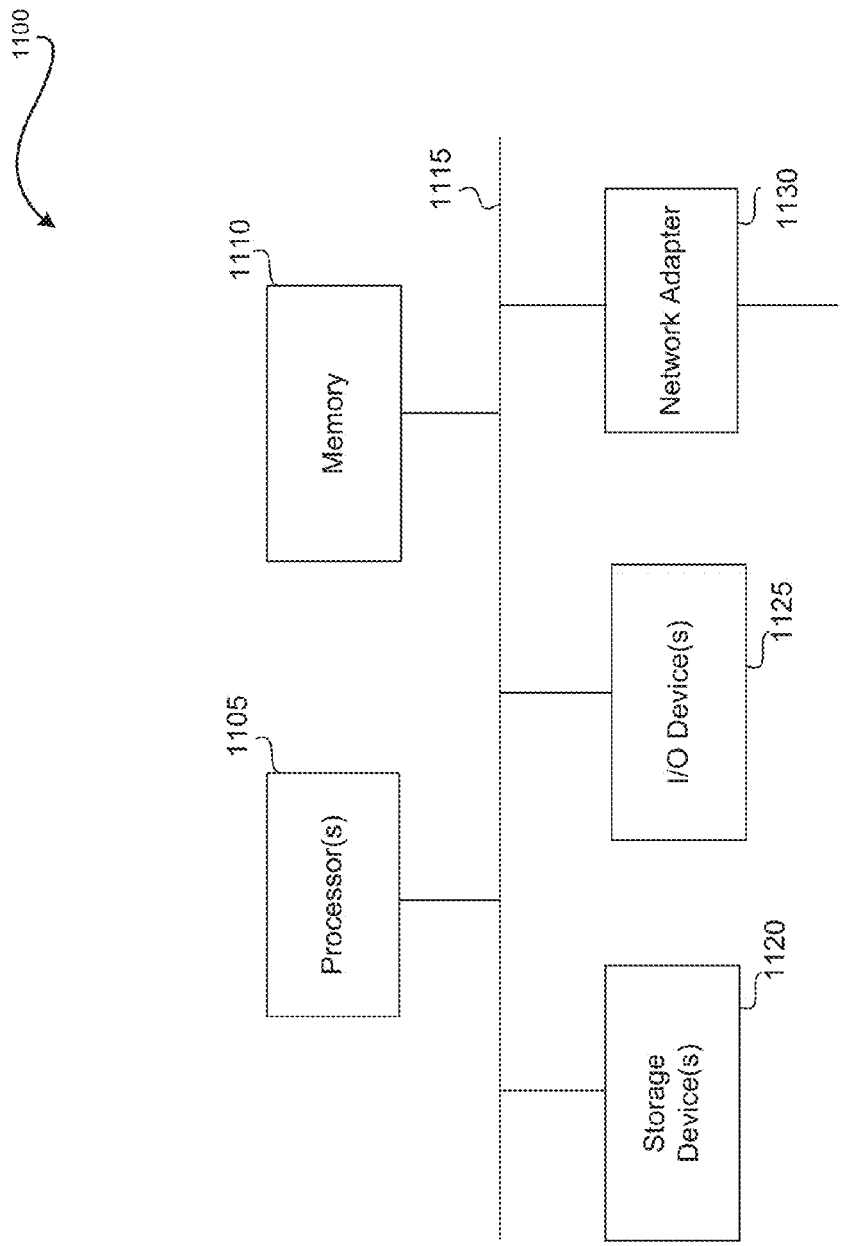
FIG. 11 is a block diagram of a computer system as may be used to implement features of some embodiments.

FIG. 11 is a block diagram of a computer system as may be used to implement features of some embodiments of the disclosed technology. The computing system 1100 may be used to implement any of the entities, components or services depicted in the examples of FIGS. 1-10 (and any other components described in this specification). The computing system 1100 may include one or more central processing units ("processors") 1105, memory 1110, input/output devices 1125 (e.g., keyboard and pointing devices, display devices), storage devices 1120 (e.g., disk drives), and network adapters 1130 (e.g., network interfaces) that are connected to an interconnect 1115. The interconnect 1115 is illustrated as an abstraction that represents any one or more separate physical buses, point to point connections, or both connected by appropriate bridges, adapters, or controllers.

The interconnect 1115, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 1110 and storage devices 1120 are computer-readable storage media that may store instructions that implement at least portions of the described technology. In addition, the data structures and message structures may be stored or transmitted via a data transmission medium, such as a signal on a communications link. Various communications links may be used, such as the Internet, a local area network, a wide area network, or a point-to-point dial-up connection. Thus, computer-readable media can include computer-readable storage media (e.g., "non-transitory" media) and computer-readable transmission media.

The instructions stored in memory 1110 can be implemented as software and/or firmware to program the processor(s) 1105 to carry out actions described above. In some embodiments, such software or firmware may be initially provided to the processing system 1100 by downloading it from a remote system through the computing system 1100 (e.g., via network adapter 1130).

The technology introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Terms that are used to describe the disclosure are discussed below, or elsewhere in the specification, to provide additional guidance to the practitioner regarding the description of the disclosure. For convenience, some terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for some terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

We claim:

1. A method performed by a computing system, comprising:
   receiving an image of a setting and a color palette including a plurality of colors, the color palette to be applied to the image of the setting for generating a first image of the setting from the image of the setting based on the plurality of colors;
   categorizing the plurality of colors in the color palette into a plurality of color groups, the color groups including distinct subsets of the plurality of colors, wherein each of the color groups is applied to the image of the setting;
   analyzing the image of the setting to identify a plurality of décor accessories in the setting to identify a plurality of image sections;
   categorizing the image sections based on an area of the image sections into a plurality of image regions, wherein each of the image regions forms a specified percentage of an area of the image of the setting defined by a harmony-distribution rule, wherein a first image region of the image regions occupies a highest percentage of the area among all the image regions, wherein the number of image regions is the same as the number of color groups;
   assigning each of the image regions to one of the color groups based on the harmony-distribution rule, the harmony-distribution rule assigning each of the image regions to one of the color groups based on a specified percentage of the area of the image of the setting the corresponding image region forms, wherein the first image region is assigned to a first color group of the color groups that is designated to be assigned to one of the image regions that occupies the highest percentage of the area in the image of the setting;
   generating the first image of the setting from the image of the setting based on the plurality of colors by:
      generating a décor accessory in the first image of the setting with a color from a specified color group of the color groups to which an image region the décor accessory corresponds to is assigned, based on the harmony-distribution rule;
   receiving a request to search for a set of décor accessories that matches with one or more attributes of the décor accessory in the first image of the setting; and
   performing a search at a storage system associated with the computing system to retrieve images of the set of décor accessories, the set of décor accessories having one or more attributes that matches with the one or more attributes of the décor accessory in the first image of the setting.

2. The method of claim 1, wherein each of the image regions occupies a different percentage of the area of the image of the setting.

3. The method of claim 1, wherein the image regions includes at least a pair of the image regions that occupies the same percentage of the area of the image of the setting.

4. The method of claim 1, wherein the first color group includes a second plurality of colors, the second plurality of colors being a subset of the colors.

5. The method of claim 4, wherein assigning the first image region to the first color group includes assigning different image sections in the first image region to different colors from the second plurality of colors.

6. The method of claim 1, wherein a quantity of the image regions is equal to a quantity of the color groups.

7. The method of claim 1, wherein categorizing the colors in a color palette includes receiving the color palette from a client device associated with a user.

8. The method of claim 7, wherein receiving the color palette from the user includes:
   presenting a plurality of color palettes to the user at the client device, and
   receiving a user selection of one of the color palettes as the color palette.

9. The method of claim 7, wherein receiving the color palette from the user includes:
   receiving an image of a décor accessory from the user,
   analyzing the image of the décor accessory to identify one or more colors from a set of colors in the image of décor accessory, and
   retrieving a plurality of color palettes from a storage system associated with computing system that includes at least one of the one or more colors.

10. The method of claim 9, wherein analyzing the image includes analyzing the image based on a color-blob extraction technique.

11. The method of claim 1, wherein categorizing the colors in a color palette includes analyzing the color palette to identify from metadata of the color palette a color group of the color groups to which a color of the colors belong.

12. The method of claim 1 further comprising:
    generating a first image of the setting, the generating including generating a décor accessory in the first image of the setting with a color from a color group to which an image section the décor accessory corresponds to is assigned based on the harmony-distribution rule, the décor accessory being one of the décor accessories, the color group being one of the color groups, the image section being one of the image sections.

13. The method of claim 12, wherein generating the first image of the setting includes generating the first image of the setting using computer generated imagery (CGI) technique.

14. The method of claim 12, wherein generating the first image of the setting using CGI technique includes generating at least some of the décor accessories as independent layers in the first image of the setting.

15. The method of claim 12 further comprising:
receiving a request from a user for purchasing the décor accessory generated in the first image of the setting;
performing a search at a storage system associated with the computing system to retrieve an image of the décor accessory, wherein the search is performed using the color of the décor accessory as a search parameter;
retrieving the image of the décor accessory from the storage system, wherein the storage system stores the color of the décor accessory as metadata of the image of the décor accessory.

16. A method performed by a computing system, comprising:
receiving a user input of a color palette, the color palette including a plurality of colors and to be applied to a representation of a setting for generating a first image of the setting based on the plurality of colors;
classifying the plurality of colors in the color palette into a plurality of color groups, each of the color groups forming a non-overlapping subset of the colors, wherein each of the color groups is applied to the representation of the setting;
analyzing the representation of the setting to identify a plurality of décor accessories;
classifying the décor accessories into a plurality of regions based on a harmony-distribution rule, each of the regions including a non-overlapping subset of the décor accessories, wherein each of the regions forms a specified percentage of an area of the representation of the setting defined by the harmony-distribution rule, wherein a first region of the regions occupies a highest percentage of the area in the representation of the setting among all the regions, wherein the number of regions is the same as the number of color groups;
generating a mapping to assign each of the regions to a distinct color group of the color groups based on the harmony-distribution rule, wherein the first region is assigned to a first color group of the color groups that is designated to be assigned to one of the regions that occupies the highest percentage of the area in the representation of the setting;
generating the first image of the setting from the representation of the setting based on the plurality of colors by:
generating a décor accessory in the first image of the setting with a color from a specified color group of the color groups to which a region the décor accessory corresponds to is assigned, based on the harmony-distribution rule;
receiving a request to search for a set of décor accessories that matches with one or more attributes of the décor accessory in the first image of the setting; and
performing a search at a storage system associated with the computing system to retrieve images of the set of décor accessories, the set of décor accessories having one or more attributes that matches with the one or more attributes of the décor accessory in the first image of the setting.

17. The method of claim 16, wherein the representation of a setting includes an image of the setting.

18. The method of claim 17 further comprising:
generating a first image of the setting based on the mapping, the generating including generating each décor accessory of the décor accessories in the first image of the setting using a color from a color group assigned to an region the décor accessory is classified into.

19. The method of claim 17, wherein classifying the décor accessories into the regions includes identifying, based on the harmony-distribution rule, a subset of the décor accessories that occupies a specified percentage of an area of the image of the setting as a first region of the regions.

20. The method of claim 19, wherein generating the mapping includes assigning the first region to a first color group of the color groups based on the harmony-distribution rule.

21. The method of claim 17, wherein the color groups include a main color group, a feature color group and an accent color group.

22. The method of claim 21, wherein generating the mapping based on the harmony-distribution rule includes:
assigning a first region of the regions that occupies a highest percentage of an area of the image of the setting among the regions to the main color group.

23. The method of claim 21, wherein generating the mapping based on the harmony-distribution rule includes:
assigning a first region of the regions that occupies a lowest percentage of an area of the image of the setting among the regions to the accent color group.

24. The method of claim 21, wherein the main color group includes one of the colors, wherein the feature color group includes a second plurality of the colors and the accent color group includes a third plurality of the colors.

25. The method of claim 21, wherein generating the mapping further includes:
assigning a first region of the regions to the feature color group, the assigning including assigning a first set of the décor accessories in the first region to a first color of the second plurality of the colors and a second set of the décor accessories in the first region to a second color of the second plurality of the colors.

26. The method of claim 25 further comprising:
generating a first mapping to assign the first set of the décor accessories to the second color and the second set of the décor accessories to the first color.

27. The method of claim 16, wherein the color palette is one of a plurality of color palettes, the color palettes classified into a plurality of categories.

28. The method of claim 27, wherein receiving the color palette includes:
presenting the categories at a client device associated with the user,
receiving a user selection of a category of the categories, and
presenting at least a subset of the color palettes that belong to the category.

29. The method of claim 27, wherein the categories include a category that is based on a color mood.

30. A non-transitory computer-readable storage medium storing computer-readable instructions, comprising:
instructions for generating a color palette based on a representation of a décor accessory, the color palette including a plurality of colors and to be applied to a representation of a setting for generating a first image of the setting based on the plurality of colors;
instructions for classifying the plurality of colors in the color palette into a plurality of color groups, each of the color groups including a subset of the colors, wherein each of the color groups is applied to the representation of the setting;

instructions for classifying a plurality of décor accessories in the representation of the setting into a plurality of regions based on a harmony-distribution rule, each of the regions including a subset of the décor accessories, wherein each of the regions forms a specified percentage of an area of the representation of the setting defined by the harmony-distribution rule, wherein a first region of the regions occupies a highest percentage of the area in the representation of the setting among all the regions, wherein the number of regions is the same as the number of color groups; and instructions for generating a mapping to assign each of the regions to a distinct color group of the color groups based on the harmony-distribution rule, wherein the first region is assigned to a first color group of the color groups that is designated to be assigned to one of the regions that occupies the highest percentage of the area in the representation of the setting.

31. The computer-readable storage medium of claim 30, wherein the instructions for generating the color palette based on the representation of a décor accessory includes:

instructions for analyzing the representation of the décor accessory to identify one or more colors from a set of colors in the representation of the décor accessory, instructions for retrieving a plurality of color palettes from a storage system, each of the color palettes including at least one of the one or more colors, and instructions for using one of the color palettes as the color palette.

32. The computer-readable storage medium of claim 30 further comprising:

instructions for generating a first representation of the setting based on the mapping, the generating including associating each décor accessory of the décor accessories in the first representation of the setting a color from a color group assigned to a region the décor accessory is classified into.

33. The computer-readable storage medium of claim 30, wherein the instructions for classifying the décor accessories into the regions includes instructions for identifying, based on the harmony-distribution rule, a subset of the décor accessories that occupies a specified percentage of an area of the setting as a first region of the regions.

34. The computer-readable storage medium of claim 33, wherein the instructions for generating the mapping includes instructions for assigning, based on the harmony-distribution rule, the first region to the first color group.

35. The computer-readable storage medium of claim 30, wherein the instructions for classifying the colors in the color palette into the color groups includes:

instructions for classifying a color of the colors into a color group of the color groups based on metadata associated with the color palette, the metadata specifying the color group to which the color belongs.

36. A system, comprising:

a processor;

a color grouping module configured to categorize, using the processor, a plurality of colors in a color palette into a plurality of color groups, the color groups including distinct subsets of the colors, the color palette to be applied to an image of a setting for generating a first image of the setting based on the plurality of colors, wherein each of the color groups is applied to the image of the setting;

a section grouping module configured to identify, using the processor, a plurality of décor accessories in the image of the setting as a plurality of image sections; and a color mapping module configured to generate, using the processor, a mapping, the mapping assigning each of the image sections to one of the color groups based on a harmony-distribution rule, the mapping including:

identifying, based on the harmony-distribution rule, a subset of the image sections that occupies a highest percentage of an area of the image of the setting as a first image region, wherein the first image is one a plurality of image regions, wherein the number of regions is the same as the number of color groups, and assigning the first image region to a first color group of the color groups based on the harmony-distribution rule.

37. The system of claim 36, wherein different image regions are assigned to different color groups.

38. The system of claim 36 further comprising:

an image generation module to generate an updated image of the setting based on the mapping.

39. The system of claim 38, wherein the image generation module is configured to generate the updated image of the setting by generating each décor accessory of the décor accessories with a color from a color group to which an image section the décor accessory corresponds to is assigned, the color group being one of the color groups, the image section being one of the image sections.

40. The system of claim 39 further comprising:

a product discovery module to perform a search at a storage system to retrieve an image of a décor accessory generated in the first image of the setting, wherein the fifth module is configured to perform the search using a color of the décor accessory as a search parameter, wherein the storage system stores the color of the décor accessory as metadata of the image of the décor accessory.

41. The system of claim 40 further comprising:

a transceiver module to present the image of the décor accessory at a client device associated with a user in response to a request from the user for purchasing the décor accessory.

42. The system of claim 38, wherein the image generation module is configured to generate the first image of the setting using CGI technique.

* * * * *